No. 732,641. Patented June 30, 1903.

UNITED STATES PATENT OFFICE.

THOMAS B. JOSEPH, OF SALT LAKE CITY, UTAH.

METAL-LEACHING PROCESS.

SPECIFICATION forming part of Letters Patent No. 732,641, dated June 30, 1903.

Application filed September 10, 1902. Serial No. 122,793. (No specimens.)

*To all whom it may concern:*

Be it known that I, THOMAS B. JOSEPH, a citizen of the United States, residing at Salt Lake City, in the county of Salt Lake and State of Utah, have invented certain new and useful Improvements in Metal-Leaching Processes; and I do declare the following to be a full, clear, and exact description of the invention, such as will enable others skilled in the art to which it appertains to make and use the same.

My invention relates to the extraction of metals from their ores—such as nickel, zinc, and tin—but more particularly to the extraction of copper, silver, and gold, and has for its object to extract said metals from ore containing the same when in a suitable condition.

In carrying out my process the ore should first be crushed or pulverized to a fine powder before being put in the leaching-tank, which may be of any desired size and form, or it may be a revolving tank. It should, however, be of such material and construction as not to be liable to the chemical action of the leaching solution. Before the ore is put into the leaching-tank I run in a solution composed of hot water a salt and chamber sulfuric acid at about the proportion of thirty pounds of the latter to the ton of water and chlorid of sodium at about the proportion of fifty pounds to the ton of water. This solution is well stirred, after which is added about one and one-half pounds of nitric acid and about two pounds of permanganate of potassium. These two latter are well stirred in the solution, after which about two pounds of hyposulfite of sodium is added and stirred therein, and then the ore is gradually admitted and stirred into said solution as long as desired. After the ore is allowed to be agitated or soaked in the solution until the metal or metals are extracted and dissolved into the solution said solution is then drained from the leaching-tank and run into another tank in order to precipitate the metals from the solution, which may be accomplished by any well-known process. The solution during the process of leaching would perform better work if it were heated to between 160° and 180° Fahrenheit. The solution may be heated by steam led into the leaching-tank or by admitting steam into the solution through the bottom of the tank. I prefer to precipitate any gold from the solution by dissolving therein a sufficient amount of oxalic acid and then precipitating the copper or other metals by electricity, as the solution would be contaminated if iron were used as the precipitating agent unless the solution were afterward treated with ammonia. The proportions of the ingredients of the solution should of course be varied to meet different conditions. For instance, ores containing more precious metals should be treated with the solution containing more hyposulfite of sodium and more nitric acid, while ore rich with copper would require more sulfuric acid and chlorid of sodium. If the ore or a part of it were a sulfid, then more nitric acid should be used.

Having thus described my process, I do not wish to be understood as limiting myself to the exact proportions herein set forth, but consider myself clearly entitled to all changes that fall within the limit and scope of the following claims.

The above-described process is capable of considerable variation regarding the several chemicals employed, as either sodium chlorid or hyposulfate of sodium may, if preferred, be omitted from the solution.

What I claim as new, and desire to secure by Letters Patent of the United States, is—

1. The herein-described process of extracting metals from ore containing the same while in a suitable condition, which consists in subjecting the said ore to the leaching action of a solution containing water, sulfuric acid, chlorid of sodium, nitric acid, permanganate of potassium and hyposulfite of sodium, and subsequently precipitating the metals from the solution.

2. The herein-described process of extracting metals from ore containing the same while in a suitable condition which consists in treating the said ore with a leaching solution composed of water, sulfuric acid, chlorid of sodium, nitric acid, permanganate of potassium, and hyposulfite of sodium.

3. The herein-described process of extracting metals from ore containing the same when in a suitable condition, which consists in subjecting the said ore to the leaching action of a solution containing water, sulfuric acid, nitric acid, permanganate of potassium, and hyposulfite of sodium.

4. The herein-described process of extracting metals from ore containing same when in a suitable condition, which consists in subjecting the said ore to the leaching action of a solution containing water, sulfuric acid, nitric acid, and permanganate of potassium.

In testimony whereof I affix my signature in presence of two witnesses.

THOMAS B. JOSEPH.

Witnesses:
    VIRGINIA JONES,
    ELLA PATTEN.